United States Patent
Sayed et al.

(10) Patent No.: US 11,968,602 B2
(45) Date of Patent: Apr. 23, 2024

(54) DEVICE, SYSTEM AND METHOD FOR SYNCHRONIZING OF DATA FROM MULTIPLE SENSORS

(71) Applicants: STMICROELECTRONICS, INC., Coppell, TX (US); STMICROELECTRONICS S.r.l., Agrate Brianza (IT)

(72) Inventors: Karimuddin Sayed, Fremont, CA (US); Chandandeep Singh Pabla, Fremont, CA (US); Lorenzo Bracco, Chivasso (IT); Federico Rizzardini, Settimo Milanese (IT)

(73) Assignees: STMICROELECTRONICS S.r.l., Agrate Brianza (IT); STMICROELECTRONICS, INC., Coppell, TX (US)

( * ) Notice: Subject to any disclaimer, the term of this patent is extended or adjusted under 35 U.S.C. 154(b) by 393 days.

(21) Appl. No.: 17/356,180

(22) Filed: Jun. 23, 2021

(65) Prior Publication Data
US 2021/0409914 A1   Dec. 30, 2021

Related U.S. Application Data

(60) Provisional application No. 63/046,487, filed on Jun. 30, 2020.

(51) Int. Cl.
*H04W 4/38* (2018.01)
*G01D 5/244* (2006.01)
(Continued)

(52) U.S. Cl.
CPC .......... *H04W 4/38* (2018.02); *G01D 5/24404* (2013.01); *G01D 9/005* (2013.01); *H04W 4/70* (2018.02)

(58) Field of Classification Search
None
See application file for complete search history.

(56) References Cited

U.S. PATENT DOCUMENTS 7,782,307 B2 *   8/2010   Westerman ........... G06F 3/0447
                                                                345/173
9,116,220 B2 *   8/2015   Liu ....................... G01S 5/0018
(Continued)

FOREIGN PATENT DOCUMENTS

AU    2012236922 A1 *  11/2013  ......... A61B 5/14551
CA       2761918 A1 *  11/2010  ............... G01B 7/16
(Continued)

OTHER PUBLICATIONS

Wåhslén, "Multi-Sensor Data Synchronization using Mobile Phones," Thesis, Department of Computer and Electrical Engineering School of Technology and Health, KTH (Royal Institute of Technology), Stockholm, Sweden, 26 pages, 2013.
(Continued)

*Primary Examiner* — Fekadeselassie Girma
(74) *Attorney, Agent, or Firm* — Seed IP Law Group LLP

(57) ABSTRACT

In an embodiment, a device comprises a memory, which, in operation, stores data samples associated with a plurality of data sensors, and circuitry, coupled to the memory, wherein the circuitry, in operation, generates synchronized output data sets associated with the plurality of data sensors. Generating a synchronized output data set includes: determining a reference sample associated with a sensor of the plurality of sensors; verifying a timing validity of a data sample associated with another sensor of the plurality of sensors; identifying a closest-in-time data sample associated with the another sensor of the plurality of sensors with respect to the reference sample; and generating the synchronized output data set based on interpolation.

24 Claims, 8 Drawing Sheets

(51) Int. Cl.
     *G01D 9/00*          (2006.01)
     *H04W 4/70*        (2018.01)

(56) References Cited

U.S. PATENT DOCUMENTS

| | | | |
|---|---|---|---|
| 9,911,340 B2* | 3/2018 | Samarasekera | G01C 21/3673 |
| 11,431,561 B2* | 8/2022 | Smith | H04W 4/08 |
| 2014/0040653 A1* | 2/2014 | Etkin | G01V 1/362 |
| | | | 713/500 |
| 2015/0185054 A1* | 7/2015 | Hesch | G06F 1/14 |
| | | | 702/187 |
| 2016/0097756 A1* | 4/2016 | Borkholder | G01N 33/227 |
| | | | 73/35.15 |
| 2019/0349426 A1* | 11/2019 | Smith | H04L 67/104 |
| 2021/0409914 A1* | 12/2021 | Sayed | G01D 5/24404 |

FOREIGN PATENT DOCUMENTS

| | | | | |
|---|---|---|---|---|
| EP | 2602767 A1 * | 6/2013 | | G07B 15/06 |
| JP | 4028818 B2 * | 12/2007 | | |

OTHER PUBLICATIONS

Stieber et al., "Accurate Sample Time Reconstruction of Inertial FIFO Data," *Sensors* 17:2894, 2017, 15 pages.

* cited by examiner

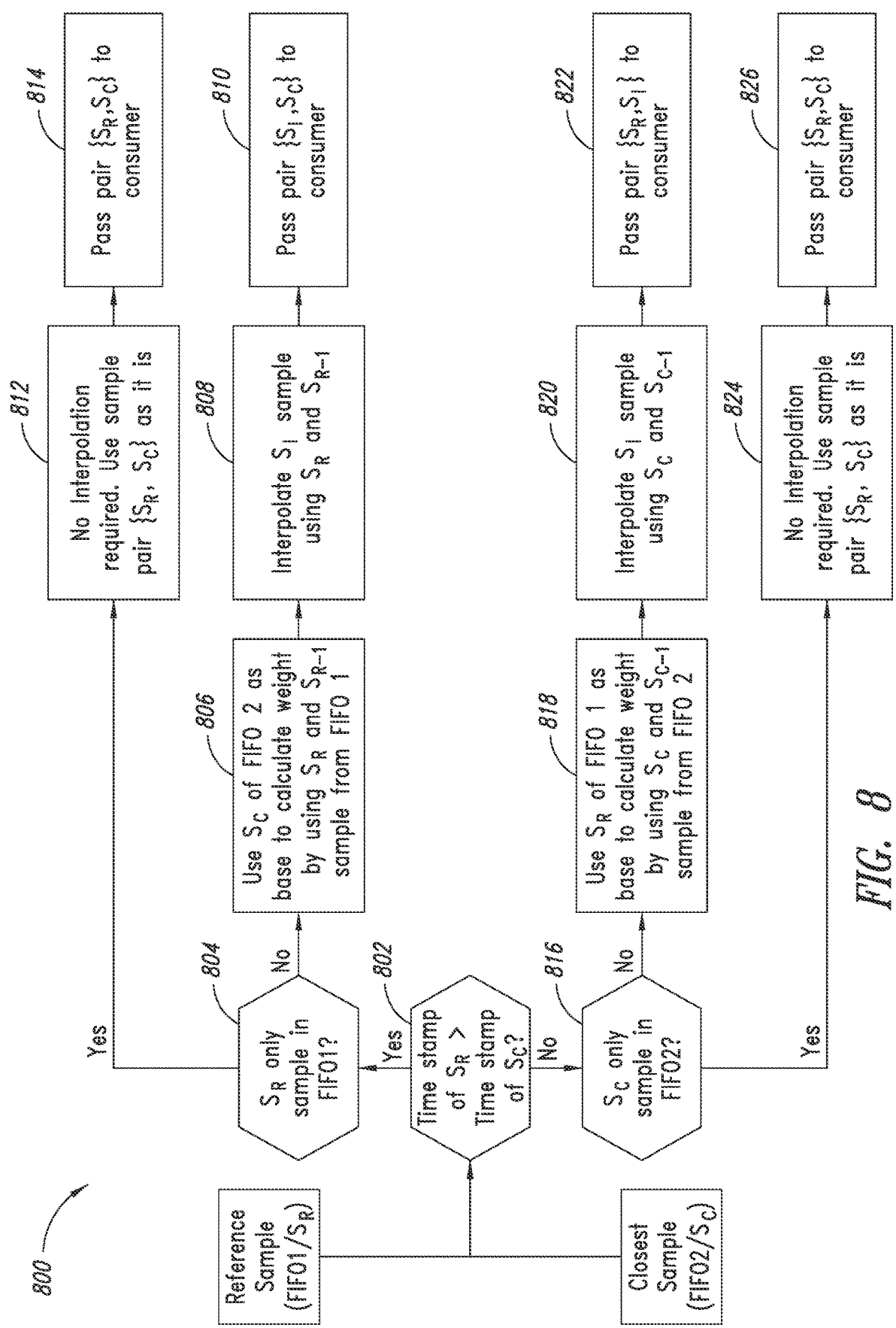

DEVICE, SYSTEM AND METHOD FOR SYNCHRONIZING OF DATA FROM MULTIPLE SENSORS

BACKGROUND

Technical Field

The present disclosure generally relates to management of sensor data received from multiple sensors, such as in embedded systems employing processes or algorithms which use data from multiple sensors.

Description of the Related Art

In complex systems, such as mobile phones, virtual reality headsets, automobiles, etc., a significant number and perhaps a majority of the programs and algorithms may rely on data received from multiple sensors. For example, a system process (e.g., detecting a fall of a device, detecting a lid angle of a device, classifying an activity associated with use of the device, etc.) may be based on sensor data from multiple sensors, such as multiple accelerometers. The sensor data may even be from sensors of different types (e.g., two accelerometers and two gyroscopes; one or more accelerometers and a temperature sensor, temperature and pressure sensors, etc.).

In addition, the sensor data of the various sensors of a system may be used for multiple purposes. For example, an accelerometer and a gyroscope may both provide data for first process (e.g., detecting a lid angle of a device, an image stability algorithm for an image capturing device, for example using an algorithm), while data from the accelerometer, a temperature sensor and a pressure sensor are used to provide data for another process (e.g., a trained artificial neural network classifying a current activity associated with the device or generating classification signals for use by an algorithm controlling moving of a robot, virtual reality applications, etc.).

BRIEF SUMMARY

Lack of synchronization of data from multiple sensors may have a significant detrimental impact on the performance and accuracy of processes which use data from the sensors. The impact may be even more severe when the sensors are of different types. In addition, synchronizing data from multiple sensors is complicated due to the independent uses of the data by different processes, which may use data from different combinations of sensors. One or more embodiments may facilitate synchronization of data used by processes of the device.

In an embodiment, a device comprises a memory, which, in operation, stores data samples associated with a plurality of data sensors, and circuitry, coupled to the memory, wherein the circuitry, in operation, generates synchronized output data sets associated with the plurality of data sensors. Generating a synchronized output data set includes: determining a reference sample associated with a sensor of the plurality of sensors; verifying a timing validity of a data sample associated with another sensor of the plurality of sensors; identifying a closest-in-time data sample associated with the another sensor of the plurality of sensors with respect to the reference sample; and generating the synchronized output data set based on interpolation.

In an embodiment, a system comprises: a plurality of data sensors; a memory, which, in operation, stores data samples associated with the plurality of data sensors; and circuitry, coupled to the memory, wherein the circuitry, in operation, generates synchronized output data sets associated with the plurality of data sensors. The generating a synchronized output data set includes: determining a reference sample associated with a sensor of the plurality of sensors; verifying a timing validity of a data sample associated with another sensor of the plurality of sensors; identifying a closest-in-time data sample associated with the another sensor of the plurality of sensors with respect to the reference sample; and generating the synchronized output data set based on interpolation.

In an embodiment, a method comprises: generating synchronized output data sets associated with a plurality of data sensors, the generating a synchronized output data set including: determining a reference sample associated with a sensor of the plurality of sensors; verifying a timing validity of a data sample associated with another sensor of the plurality of sensors; identifying a closest-in-time data sample associated with the another sensor of the plurality of sensors with respect to the reference sample; and generating the synchronized output data set based on interpolation.

In an embodiment, a non-transitory computer-readable medium's contents cause a computing device to generate synchronized output data sets associated with a plurality of data sensors. The generating a synchronized output data set includes: determining a reference sample associated with a sensor of the plurality of sensors; verifying a timing validity of a data sample associated with another sensor of the plurality of sensors; identifying a closest-in-time data sample associated with the another sensor of the plurality of sensors with respect to the reference sample; and generating the synchronized output data set based on interpolation. In an embodiment, the contents comprise instructions executed by the computing device.

BRIEF DESCRIPTION OF THE SEVERAL VIEWS OF THE DRAWINGS

FIG. 8 illustrates an embodiment of a method of generating synchronized data samples using interpolation.

DETAILED DESCRIPTION

Figure 1:
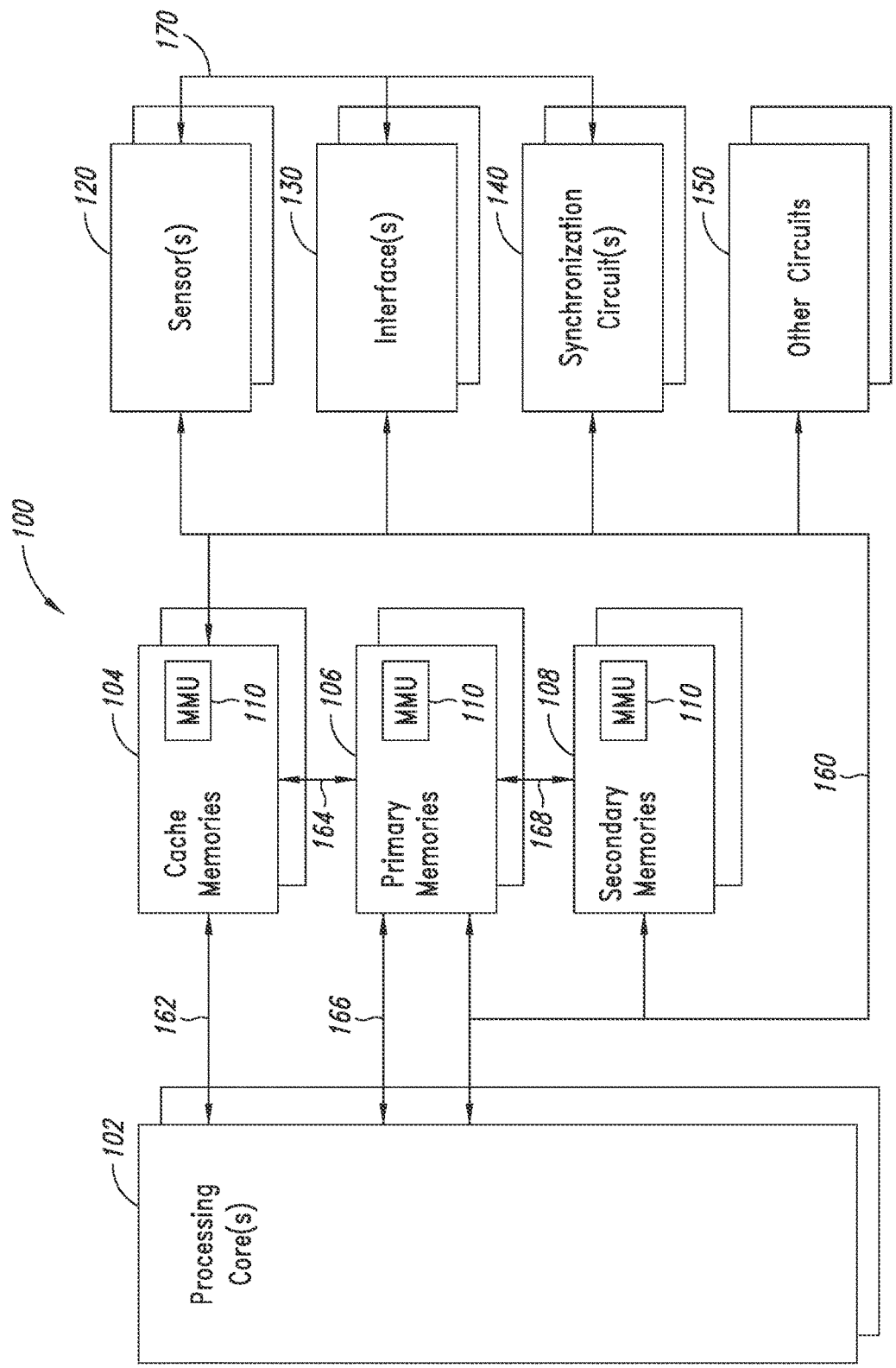
FIG. 1 is a functional block diagram of an embodiment of an electronic device or system having sensor data synchronization circuitry according to an embodiment.

In the following description, certain details are set forth in order to provide a thorough understanding of various embodiments of devices, systems, methods and articles. However, one of skill in the art will understand that other embodiments may be practiced without these details. In other instances, well-known structures and methods associated with, for example, circuits, such as transistors, multipliers, adders, dividers, comparators, transistors, integrated circuits, logic gates, finite state machines, memories, interfaces, bus systems, buffers, etc., and sensors, such as MEMS structures of sensors, etc., have not been shown or described in detail in some figures to avoid unnecessarily obscuring descriptions of the embodiments.

Unless the context requires otherwise, throughout the specification and claims which follow, the word "comprise" and variations thereof, such as "comprising," and "comprises," are to be construed in an open, inclusive sense, that is, as "including, but not limited to." Reference to "at least one of" shall be construed to mean either or both the disjunctive and the inclusive, unless the context indicates otherwise.

Reference throughout this specification to "one embodiment," or "an embodiment" means that a particular feature, structure or characteristic described in connection with the embodiment is included in at least one embodiment. Thus, the appearances of the phrases "in one embodiment," or "in an embodiment" in various places throughout this specification are not necessarily referring to the same embodiment, or to all embodiments. Furthermore, the particular features, structures, or characteristics may be combined in any suitable manner in one or more embodiments to obtain further embodiments.

The headings are provided for convenience only, and do not interpret the scope or meaning of this disclosure.

The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn are not necessarily intended to convey any information regarding the actual shape of particular elements, and have been selected solely for ease of recognition in the drawings.

FIG. 1 is a functional block diagram of an embodiment of an electronic device or system 100 of the type to which the embodiments which will be described may apply. The system 100 comprises one or more processing cores or circuits 102. The processing cores 102 may comprise, for example, one or more processors, a state machine, a microprocessor, a programmable logic circuit, discrete circuitry, logic gates, registers, etc., and various combinations thereof. The processing cores may control overall operation of the system 100, execution of application programs by the system 100, etc.

The system 100 includes one or more memories, such as one or more volatile and/or non-volatile memories which may store, for example, all or part of instructions and data related to control of the system 100, applications and operations performed by the system 100, etc. As illustrated, the system 100 includes one or more cache memories 104, one or more primary memories 106, and one or more secondary memories 108, each comprising memory management circuitry or MMUs 110. The memory management circuitry 110, in operation, employs one or more memory management routines to allocate regions of the memory (see, e.g., memory arrays) to various processes executed by the system 100.

The system 100 may include one or more sensors 120 (e.g., accelerometers, gyroscopes, pressure sensors, temperature sensors, etc), one or more interfaces 130 (e.g., wireless communication interfaces, wired communication interfaces, sensor interfaces, etc.), one or more synchronization circuits 140, and other circuits 150, which may include artificial neural network circuitry (e.g., convolutional accelerators, data movers, etc.), image stabilization circuitry, display circuitry, antennas, power supplies, etc., and a main bus system 160. The main bus system 160 may include one or more data, address, power and/or control buses coupled to the various components of the system 100. The system 100 also may include additional bus systems such as bus system 162, which communicatively couples the cache memory 104 and the processing core 102, bus system 164, which communicatively couples the cache memory 104 and the primary memory 106, bus system 166, which communicatively couples the primary memory 106 and the processing core 102, bus system 168, which communicatively couples the primary memory 106 and the secondary memory 108, and one or more bus systems 170, which communicative couple one or more sensors 120, one or more sensor interfaces 130 and one or more synchronization circuits 140.

The system 100 may be used, for example, to generate control signals based on sensor data, to implement an ANN to generate classifications based on sensor data, etc. It is noted that the embodiment of FIG. 1 may comprise a system on a chip.

In some embodiments, the system 100 may include more components than illustrated, may include fewer components than illustrated, may split illustrated components into separate components, may combine illustrated components, etc., and various combinations thereof. For example, in an embodiment one or more sensor interfaces 130 may include a synchronization circuit 140, one or more synchronization circuits 140 may include one or more sensor interfaces 130, etc. In an another example, a processing core 102 may implement one or more of the functions of one or more synchronization circuits 140, for example by executing a state machine, by executing instructions stored in a memory (e.g., primary memory 106), etc.

Figure 2:
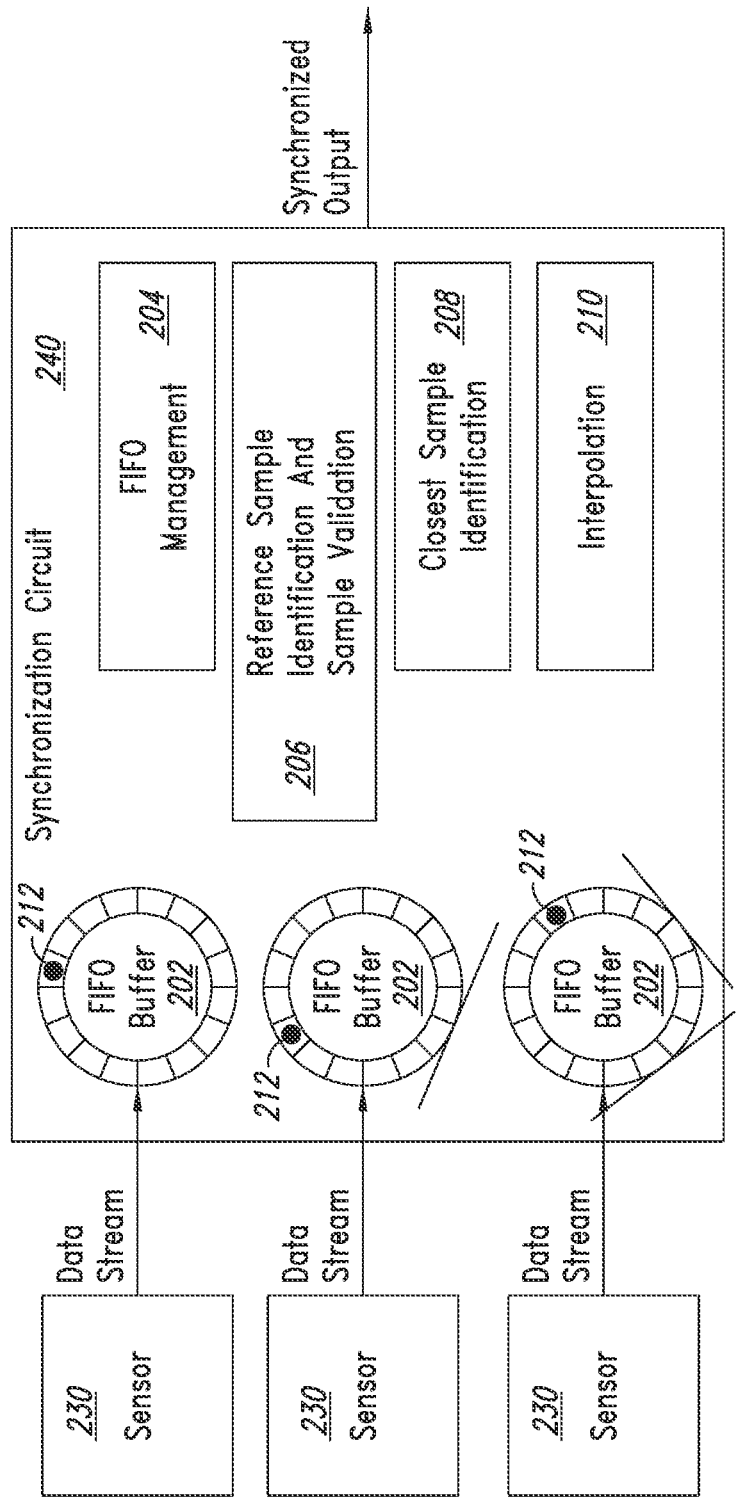
FIG. 2 is a functional block diagram of an embodiment of a synchronization circuit.

FIG. 2 is a functional block diagram of an embodiment of a synchronization circuit 240, which may be employed, for example, in a synchronization circuit 140 of FIG. 1. In the depicted embodiment, the synchronization circuit 240 comprises a plurality of sensor data buffers 202, which as illustrated are circular first-in-first-out (FIFO) buffers, buffer management circuitry 204, as illustrated FIFO management circuitry, reference sample identification and validation circuitry 206, closest sample identification circuitry 208 and interpolation circuitry 210. The synchronization circuit 240 may implement the the buffer management circuitry 204, the reference sample identification and validation circuitry 206, the closest sample identification circuitry 208 and interpolation circuitry 210 in various manners, such as using discrete circuitry, one or more processing cores executing instructions, one or more state machines, etc., and various combinations thereof.

In operation, the FIFO buffers 202 receive sensor data streams from respective sensors 230 generating data to be synchronized before use (for example, by one or more processes of system 100 of FIG. 1. The FIFO buffers 202 store data samples from the received data streams. The FIFO buffers 202 may be implemented as software buffers and may have different and configurable sizes which may be dynamically changed based on a system configuration, such as a highest supported output data rate (ODR), which is a rate at which a sensor is generating data, a batching period of the sensor (see illustrated watermarks 212), threshold maximum allowed batching periods and latencies, etc.

The FIFO management circuitry 204 manages storage of received sensor data samples in the FIFO buffers 202. The reference sample identification and sample validation circuitry 206 identifies a reference sample associated with a data buffer 202 storing data to be synchronized and determines whether other data buffers 202 associated with data to be synchronized store valid data samples. The closest sample identification circuitry 208 identifies the closest samples from the other data buffers, and may identify samples using a threshold range. The interpolation circuitry 210 generates synchronized output data based on the closest samples using interpolation. Examples of the operation of the synchronization circuit 240 are discussed below with reference to FIGS. 3-8.

In some embodiments, the synchronization circuit 240 may include more components than illustrated, may include fewer components than illustrated, may split illustrated components into separate components, may combine illustrated components, etc., and various combinations thereof. For example, in an embodiment the synchronization circuit 240 may include a processor and a memory (see processing core 102 and memory 106 of FIG. 1), which in operation implement the functionality of one or more of the FIFO buffers 202, the FIFO management circuitry 204, the reference sample identification and sample validation circuitry 206, the closest sample identification circuitry 208, and/or the interpolation circuitry 210, etc.

Figure 3:
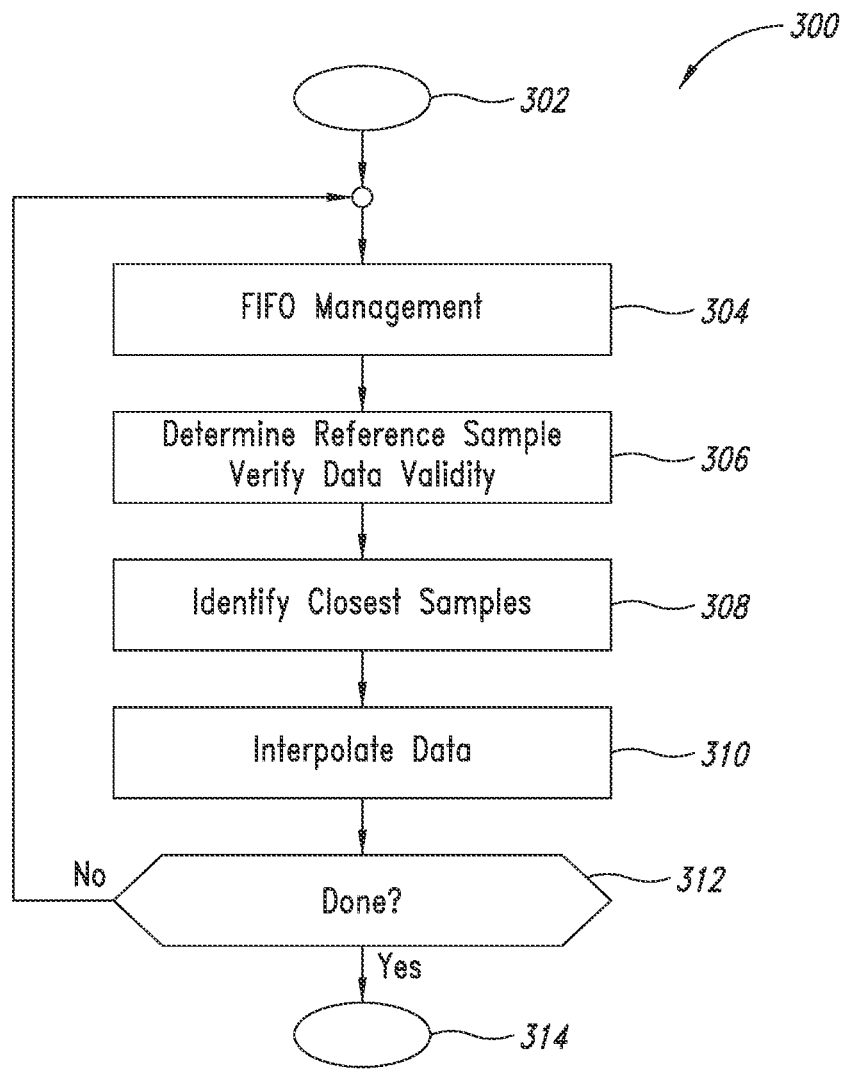
FIG. 3 illustrates an embodiment of a method of synchronizing sensor data.

FIG. 3 illustrates an embodiment of a general flow of an embodiment of a process 300 of synchronizing data samples from a plurality of sensors, which may be employed, for example, by an embodiment of the system 100 of FIG. 1 or by an embodiment of the synchronization circuit 240 of FIG. 2. The method 300 of FIG. 3 will be described for convenience with reference to FIGS. 1, 2, and 4-8.

The method 300 starts at 302. The method 300 may be started, for example, as part of routine which uses data samples from a plurality of sensors to generate control signals, such as image stabilization control signals, display control signals, etc., in response to receipt of data samples from a sensor, etc. The method 300 proceeds from 302 to 304.

At 304, the method 300 manages storage of sensor data samples. For example, the sensor data samples may be stored in FIFO memory, such as the one or more FIFO data buffers 202 of FIG. 2, and management of the sample storage may be performed by FIFO management circuitry 204. Data from various sensors may arrive at different data rates and with different batching periods. A software FIFO may be implemented, for example by FIFO management circuitry 204, for each sensor 230. As mentioned above, the size of each FIFO may be dynamically changed based on different system configurations. The method 300 proceeds from 304 to 306.

At 306, the method 300 determines a reference sample for a sensor of the plurality of sensors and verifies data timing validity of samples for the other sensors of the plurality of sensors is verified. For example, with reference to FIG. 2, the reference sample identification and sample validation circuitry 206 may identify a reference sample associated with a data buffer 202 storing data to be synchronized and determine whether other data buffers 202 associated with data to be synchronized store valid data samples. This may be done, for example, using embodiments of the methods described below with reference to FIGS. 4-7. The method 300 proceeds from 306 to 308.

At 308, the method 300 identifies the closest samples of data associated with other sensors of the plurality of sensors. For example, with reference to FIG. 2, the closest sample identification circuitry 208 may identify the closest samples from the other data buffers (the buffers not storing the reference sample), which may include identifying samples using a threshold range. This may be done, for example, using embodiments of the method 700 described below with reference to FIG. 7. The method 300 proceeds from 308 to 310.

At 310, the method 300 generates synchronized output data based on the closest samples using interpolation. For example, with reference to FIG. 2, the interpolation circuitry 210 may generate synchronized output data based on the closest samples stored in the FIFO data buffers 202 using interpolation. This may be done, for example, using embodiments of the method described below with reference to FIG. 8. The method 300 proceeds from 310 to 312. In some embodiments, interpolation may be selectively applied. For example, when a FIFO data buffer includes only one valid sample, the sample may be included in the synchronized output data without applying interpolation to the sample.

At 312, the method 300 determines whether the method 300 is finished or should continue. For example, a routine may periodically request data samples for a threshold period of time or until a threshold number of samples is obtained, and it may be determined the method 300 is finished when the threshold time has elapsed or the threshold number of synchronized samples has been generated. When it is determined at 312 that the method 300 is finished, the method 300 proceeds from 312 to 314, whether the method 300 may terminate, may perform other processes (such as error processing, resetting or reconfiguration of the FIFO buffers), etc. When it is not determined at 312 that the method 300 is finished, the method 300 proceeds to from 312 to 304, to generate another set of synchronized samples.

Embodiments of methods of synchronizing data samples from a plurality of sensors may contain additional acts not shown in FIG. 3, may not contain all of the acts shown in FIG. 3, may perform acts shown in FIG. 3 in various orders, and may be modified in various respects. For example, the method 300 may continuously perform FIFO management at 304 as data samples continue to arrive, while also performing acts 306 to 310; may combine acts 306 and 308 or perform acts 306 and 308 iteratively (see FIG. 7); may separate act 306 into sub-acts (e.g., an act of identifying and an act of verifying); etc.; and various combinations thereof. In another example, in addition to checking the timing validity of a sample, some embodiments may perform additional validity checks on data samples, such as one or more checks on whether a sample value is valid (e.g., does the data make sense), for example, by comparing a sample value to a threshold range of valid values, etc.

Figure 4:
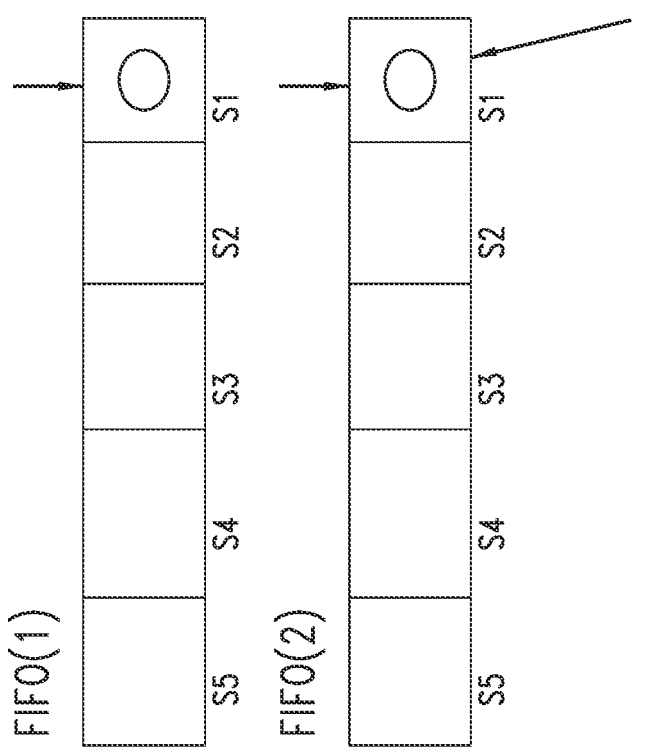
FIGS. 4 and 5 are conceptual diagrams for illustrating an embodiment of a method of determining a reference sample which may be used to synchronize data from a plurality of sensors.
Figure 5:
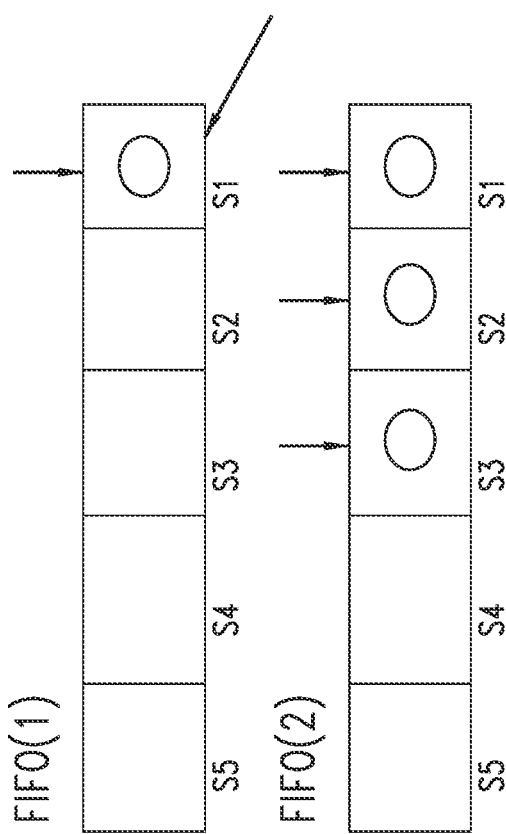

FIGS. 4 and 5 are conceptual diagrams for illustrating an embodiment of a method of determining of a reference sample which may be performed, for example, at act 306 of FIG. 3 to determine a reference sample for use in synchronization. In FIG. 4, when the first sample S1 is stored in FIFO(1) there is no sample stored in FIFO(2). Thus, the process waits until there is at least one sample stored in each FIFO buffer storing samples to be synchronized (as illustrated, there are two buffers storing samples to be sychronized). When the first sample to be stored in FIFO(2), S1, all the buffers (as illustrated, both buffers) have samples. The latest sample across all the buffers (e.g., two buffers) when the reference sample is identified is determined as the reference sample for use in synchronization. In the case of FIG. 4, the sample S1 of FIFO(2) is determined to be the reference sample.

In FIG. 5, when the first sample S1 is stored in FIFO(2), there is no sample in FIFO(1). Thus, the process waits. A second sample S2 to be stored in FIFO(2) arrives and is stored in FIFO(2). There is still no sample stored in FIFO(1), so the process continues to wait. Another sample arrives to be stored in FIFO(2) arrives, S3, and is stored in FIFO(2). A sample to be stored in FIFO(1) then arrives and is stored in FIFO(1) at S1. All the buffers (as illustrated, both buffers) have samples. The latest sample across all the buffers (e.g., two buffers), is selected as the reference sample. In the case of FIG. 5, the sample S1 stored in FIFO(1) is determined to be the reference sample.

Figure 6:
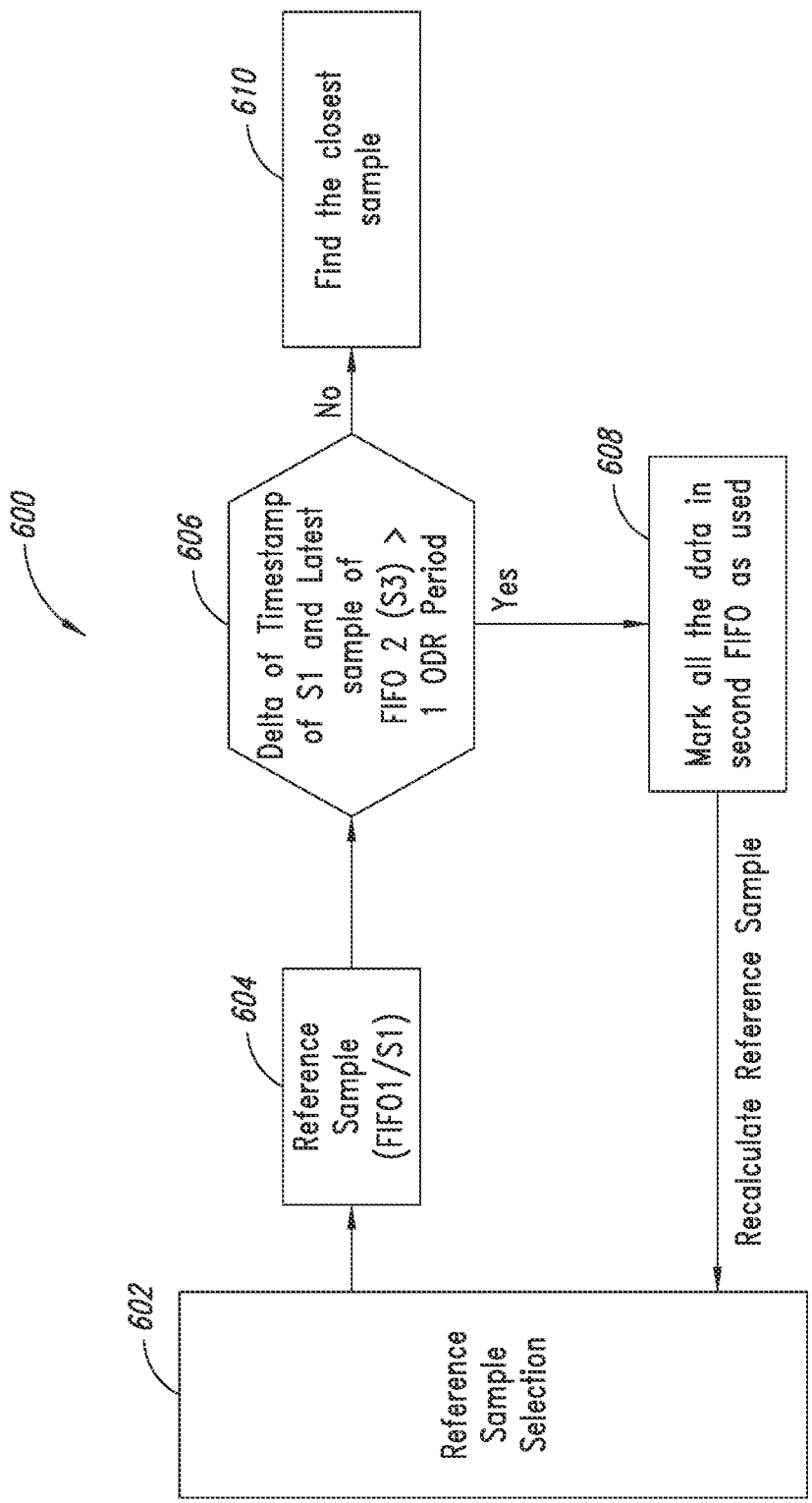
FIG. 6 illustrates an embodiment of a method of verifying a timing validity of sensor data samples.

FIG. 6 illustrates an embodiment of a method 600 of determining a reference data sensor sample and verifying the timing validity of other data sensor samples which may be performed, for example, by the embodiment of the method 300 of FIG. 3 at act 306. At 602, a reference sample selection process is performed, for example, as discussed above with respect to FIGS. 4 and 5, and the sample is provided at 604. As illustrated, the reference sample is FIFO(1) S1. The method 600 proceeds to 606, where a time difference between a time stamp of the reference sample and a time stamp of a latest sample from another buffer is compared to a threshold time difference. As illustrated, the latest sample from FIFO(2) is S3 and the threshold time difference is one ODR period of one of the sensors of the plurality of sensors (e.g., an ODR period of the another sensor, an ODR of the slowest sensor of the plurality of sensors, etc.).

When the comparison indicates the time difference is greater than the threshold (Yes at 606), the method 600 proceeds to 608, where all the data in the buffer for which the closest sample is being identified is marked as used. The method returns to 602 to wait for more data samples and perform the reference sample selection process again.

When the comparison does not indicate the time difference is greater than the threshold (No at 606), the method 600 proceeds to 610, where the closest sample is determined. Determining the closest sample may be done, for example, using the method 700 of FIG. 7.

Embodiments of methods of identifying a reference sample and verifying the timing validity of other samples may contain additional acts not shown in FIG. 6, may not contain all the acts shown in FIG. 6, may perform acts shown in FIG. 6 in various orders, and may be modified in various respects. For example, the method 600 may employ other thresholds in addition to or instead of a threshold time difference. For example, a magnitude of a data sample may be compared to a threshold magnitude, and waiting for additional data or performing of error processing may be initiated based on the comparison.

Figure 7:
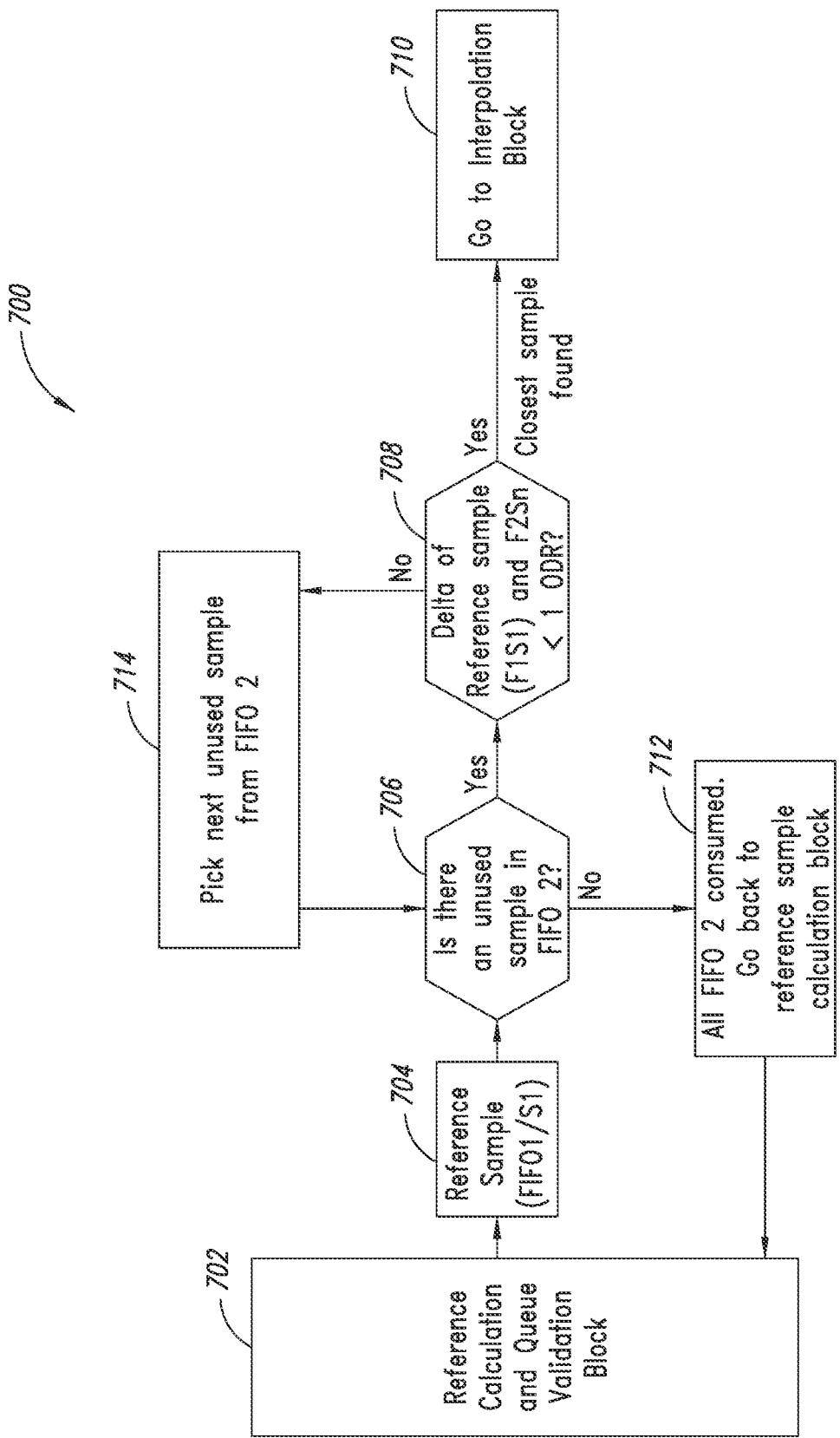
FIG. 7 illustrates an embodiment of a method of identifying closest-in-time samples of sensor data samples associated with respective sensors.

FIG. 7 illustrates an embodiment of a method 700 of determining closest in time sensor data samples with respect to a reference sample. The method 700 may be performed, for example, by the embodiment of the method 300 of FIG. 3 at act 308. For convenience, the method 700 will be described using an example where the reference sample S1 from FIFO(1), with the closest sample in FIFO(2) being determined. The method 700 may be employed to determine closest samples in a plurality of FIFOs, for example, in parallel or sequentially.

At 702, a reference sample selection and verification process is performed, for example, as discussed above with respect to FIGS. 3-6, and the sample is provided at 704. As illustrated, the reference sample is sample S1 of FIFO(1). The method 700 proceeds to 706, where the method 700 determines whether there is an unused sample in the FIFO (e.g., an available sample that has not been compared to the reference sample and which is not marked as used) for which a closest sample is to be determined. Where there is an unused sample in the FIFO for which a closest sample is to be determined, the method 700 proceeds to 708.

At 708, the method 700 compares a time difference between a time stamp of the reference sample and a time stamp of the unused sample to a threshold time difference. As illustrated, the threshold time difference is one ODR period of one of the sensors of the plurality of sensors (e.g., an ODR period of the sensor having a longest ODR period of the plurality of sensors, if all the sensors have a same ODR, an ODR period of the plurality of sensors).

When the comparison at 708 indicates the time difference is less than the threshold (Yes at 708), the current sample is selected as the closest sample and the method 700 proceeds to 710, where interpolation may be performed using the reference sample and the closest sample. For example, the method 800 of FIG. 8 may be performed.

When it is not determined at 706 that there is an unused sample in the FIFO buffer for which a closest sample is being determined, the method 700 proceeds from 706 to 712, where the method returns to 702 to perform the reference sample identification and verification process.

When the comparison at 708 does not indicate the time difference is less than the threshold (No at 708), the method 700 proceeds from 708 to 710, and selects the next unused sample from the FIFO buffer for which a closest sample is being determined as the current sample, and returns to 706.

Embodiments of methods of determining a closest sample in a FIFO buffer may contain additional acts not shown in FIG. 7, may not contain all of the acts shown in FIG. 7, may perform acts shown in FIG. 7 in various orders (e.g., in parallel, iteratively, etc.), and may be modified in various respects. For example, the method 700 may employ other thresholds in addition to or instead of a threshold time difference. For example, a magnitude of a data sample may be compared to a threshold magnitude and error or other processing initiated based on the comparison.

FIG. 8 illustrates an embodiment of a method 800 of generating synchronized output samples associated with a plurality of sensors using interpolation. The method 800 may be performed, for example, by the embodiment of the method 300 of FIG. 3 at act 310. For convenience, an example in which the reference sample $S_R$ is associated with FIFO1 and in which the closest sample $S_C$ is associated with FIFO2 is discussed. However, outputs from more than two sensors may be synchronized, for example, by performing the method 800 in parallel or repeatedly using a reference sample and a plurality of respective closest samples.

At 802, a time stamp of a reference sample ($S_R$) from one FIFO buffer (FIFO1) is compared to a time stamp of a closest sample in time ($S_C$) of another FIFO buffer (FIFO2). When at 802 the comparison indicates the time stamp of the reference sample $S_R$ is greater than the time stamp of the closest sample $S_C$, the method 800 proceeds from 802 to 804.

At 804, the method 800 determines whether the reference sample $S_R$ is the only sample in the FIFO buffer associated with the reference sample. When it is determined that the reference sample is not the only sample in the associated FIFO buffer, the method proceeds from 804 to 806.

At 806, the method 800 uses the time stamp of the closest sample $S_C$ of FIFO2 as a base to determine a weight W using $S_R$ and $S_{R-1}$, the previous sample in time in FIFO1. The method 800 proceeds from 806 to 808, where interpolation is performed to generate an interpolated sample $S_I$ using $S_R$ and $S_{R-1}$. For example, linear interpolation may be performed. Other types of interpolation (e.g., quadratic) and curve fitting may be employed. The method 800 proceeds from 808 to 810, where $S_i$ and $S_C$ are output as time synchronized data from the sensors.

When it is determined that the reference sample is the only sample in the associated FIFO buffer, the method proceeds from 804 to 812, where it is determined not to use interpolation and the method 800 proceeds to 814, where $S_R$ and $S_C$ are output as synchronized data from the sensors.

When at 802 the comparison does not indicate the time stamp of the reference sample $S_R$ is greater than the time stamp of the closest sample $S_C$, the method 800 proceeds from 802 to 816.

At 816, the method 800 determines whether the closest sample $S_C$ is the only sample in the FIFO buffer associated with the closest sample. When it is determined that the closest sample is not the only sample in the associated FIFO buffer, the method proceeds from 816 to 818.

At 818, the method 800 uses the time stamp of the reference sample $S_R$ of FIFO1 as a base to determine a weight W using $S_C$ and $S_{C-1}$, the previous sample in time in FIFO2. The method 800 proceeds from 818 to 820, where interpolation is performed to generate an interpolated sample $S_i$ using $S_C$ and $S_{C-1}$. For example, linear interpolation may be performed. Other types of interpolation (e.g., quadratic) and curve fitting may be employed. The method 800 proceeds from 820 to 822, where $S_R$ and $S_i$ are output as time synchronized data from the sensors.

When it is determined that the closest sample is the only sample in the associated FIFO buffer, the method proceeds from 816 to 824, where it is determined not to use interpolation and the method 800 proceeds to 826, where $S_R$ and $S_C$ are output as synchronized data from the sensors.

Embodiments of methods of synchronizing data samples using interpolation may contain additional acts not shown in FIG. 8, may not contain all of the acts shown in FIG. 8, may perform acts shown in FIG. 8 in various orders (e.g., in parallel, iteratively, etc.), and may be modified in various respects. For example, the method 800 may be modified to provide synchronized output data sample sets associated with three or more sensors.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

In an embodiment of the present disclosure, a device comprises a memory, which, in operation, stores data samples associated with a plurality of data sensors, and circuitry, coupled to the memory, wherein the circuitry, in operation, generates synchronized output data sets associated with the plurality of data sensors. Generating a synchronized output data set includes: determining a reference sample associated with a sensor of the plurality of sensors; verifying a timing validity of a data sample associated with another sensor of the plurality of sensors; identifying a closest-in-time data sample associated with the another sensor of the plurality of sensors with respect to the reference sample; and generating the synchronized output data set based on interpolation. In an embodiment, a weight employed in the interpolation is based on the reference sample. In an embodiment, the memory is organized into a plurality of first-in-first-out (FIFO) buffers storing data samples associated with respective sensors of the plurality of sensors.

In an embodiment of the present disclosure, the determining the reference sample includes verifying that the memory stores at least one data sample associated with each sensor of the plurality of sensors and identifying a most-recently received sample of received samples associated with sensors of the plurality of sensors as the reference sample. In an embodiment, the verifying the timing validity of a data sample comprises determining a difference between a time stamp of the data sample and a time stamp of the reference sample and comparing the difference to a threshold value. In an embodiment, the threshold value is a longest output data rate (ODR) period of the sensors of the plurality of sensors.

In an embodiment of the present disclosure, identifying a closest-in-time data sample associated with the another data sensor with respect to the reference sample comprises, starting with a most-recently received data sample associated with the another data sensor, determining a difference between a time stamp of the data sample and a time stamp of the reference sample, comparing the difference to a threshold value and identifying the data sample as the closest-in-time data sample based on the comparison. In an embodiment, the threshold value is a longest output data rate (ODR) period of the sensors of the plurality of sensors.

In an embodiment of the present disclosure, the generating the synchronized output data set based on interpolation comprises: comparing a time stamp of the reference sample to a time stamp of the closest-in-time sample. In an embodiment, the generating the synchronized output data set based on interpolation comprises: in response to the comparison indicating the time stamp of the reference sample is greater than the time stamp of the closest-in-time sample, determining whether the reference sample is the only sample associated with the sensor; in response to determining the reference sample is the only sample associated with the sensor, including the reference sample and the closest-in-time sample in the synchronized output data set; and in response to determining the reference sample is not the only sample associated with the sensor, interpolating the reference sample and including the interpolated reference sample and the closest-in-time sample in the synchronized output data set. In an embodiment, the generating the synchronized output data set based on interpolation comprises: in response to the comparison indicating the time stamp of the reference sample is not greater than the time stamp of the closest-in-time sample, determining whether the closest-in-time sample is the only sample associated with the another sensor; in response to determining the closest-in-time sample is the only sample associated with the another sensor, including the reference sample and the closest-in-time sample in the synchronized output data set; and in response to determining the closest-in-time sample is not the only sample associated with the another sensor, interpolating the closest-in-time sample and including the reference sample and the interpolated closest-in-time sample in the synchronized output data set. In an embodiment, the synchronized output data set includes data associated with two or more data sensors of the plurality of data sensors.

In an embodiment of the present disclosure, a system comprises: a plurality of data sensors; a memory, which, in operation, stores data samples associated with the plurality of data sensors; and circuitry, coupled to the memory, wherein the circuitry, in operation, generates synchronized output data sets associated with the plurality of data sensors. The generating a synchronized output data set includes: determining a reference sample associated with a sensor of the plurality of sensors; verifying a timing validity of a data sample associated with another sensor of the plurality of sensors; identifying a closest-in-time data sample associated with the another sensor of the plurality of sensors with respect to the reference sample; and generating the synchronized output data set based on interpolation. In an embodiment, the memory is organized into a plurality of first-in-first-out (FIFO) buffers storing data samples associated with respective sensors of the plurality of sensors.

In an embodiment of the present disclosure, the determining the reference sample includes verifying that the memory stores at least one data sample associated with each sensor of the plurality of sensors and identifying a most-recently received sample of received samples associated with sensors of the plurality of sensors as the reference sample.

In an embodiment of the present disclosure, identifying a closest-in-time data sample associated with the another data sensor with respect to the reference sample comprises, starting with a most-recently received data sample associated with the another data sensor, determining a difference between a time stamp of the data sample and a time stamp of the reference sample, comparing the difference to a threshold value and identifying the data sample as the closest-in-time data sample based on the comparison.

In an embodiment of the present disclosure, the generating the synchronized output data set based on interpolation comprises: comparing a time stamp of the reference sample to a time stamp of the closest-in-time sample. In an embodiment, the generating the synchronized output data set based on interpolation comprises: in response to the comparison indicating the time stamp of the reference sample is greater than the time stamp of the closest-in-time sample, determining whether the reference sample is the only sample associated with the sensor; in response to determining the reference sample is the only sample associated with the sensor, including the reference sample and the closest-in-time sample in the synchronized output data set; in response to determining the reference sample is not the only sample associated with the sensor, interpolating the reference sample and including the interpolated reference sample and the closest-in-time sample in the synchronized output data set; in response to the comparison indicating the time stamp of the reference sample is not greater than the time stamp of the closest-in-time sample, determining whether the closest-in-time sample is the only sample associated with the another sensor; in response to determining the closest-in-time sample is the only sample associated with the another sensor, including the reference sample and the closest-in-time sample in the synchronized output data set; and in response to determining the closest-in-time sample is not the only sample associated with the another sensor, interpolating the closest-in-time sample and including the reference sample and the interpolated closest-in-time sample in the synchronized output data set. In an embodiment, the synchronized output data set includes data associated with two or more data sensors of the plurality of data sensors.

In an embodiment of the present disclosure, a method comprises: generating synchronized output data sets associated with a plurality of data sensors, the generating a synchronized output data set including: determining a reference sample associated with a sensor of the plurality of sensors; verifying a timing validity of a data sample associated with another sensor of the plurality of sensors; identifying a closest-in-time data sample associated with the another sensor of the plurality of sensors with respect to the reference sample; and generating the synchronized output data set based on interpolation. In an embodiment, the method comprises storing data samples associated with the plurality of sensors into respective first-in-first-out (FIFO) buffers. In an embodiment, the determining the reference sample includes verifying that the FIFO buffers store at least one data sample associated with each sensor of the plurality of sensors and identifying a most-recently received sample of received samples associated with sensors of the plurality of sensors as the reference sample. In an embodiment, identifying a closest-in-time data sample associated with the another data sensor with respect to the reference sample comprises, starting with a most-recently received data sample associated with the another data sensor, determining a difference between a time stamp of the data sample and a time stamp of the reference sample, comparing the difference to a threshold value and identifying the data sample as the closest-in-time data sample based on the comparison.

In an embodiment of the present disclosure, the generating the synchronized output data set based on interpolation comprises: comparing a time stamp of the reference sample to a time stamp of the closest-in-time sample; in response to the comparison indicating the time stamp of the reference sample is greater than the time stamp of the closest-in-time sample, determining whether the reference sample is the only sample associated with the sensor; in response to determining the reference sample is the only sample associated with the sensor, including the reference sample and the closest-in-time sample in the synchronized output data set; in response to determining the reference sample is not the only sample associated with the sensor, interpolating the reference sample and including the interpolated reference sample and the closest-in-time sample in the synchronized output data set; in response to the comparison indicating the time stamp of the reference sample is not greater than the time stamp of the closest-in-time sample, determining whether the closest-in-time sample is the only sample associated with the another sensor; in response to determining the closest-in-time sample is the only sample associated with the another sensor, including the reference sample and the closest-in-time sample in the synchronized output data set; and in response to determining the closest-in-time sample is not the only sample associated with the another sensor, interpolating the closest-in-time sample and including the reference sample and the interpolated closest-in-time sample in the synchronized output data set.

In an embodiment of the present disclosure, a non-transitory computer-readable medium's contents cause a computing device to generate synchronized output data sets associated with a plurality of data sensors. The generating a synchronized output data set includes: determining a reference sample associated with a sensor of the plurality of sensors; verifying a timing validity of a data sample associated with another sensor of the plurality of sensors; identifying a closest-in-time data sample associated with the another sensor of the plurality of sensors with respect to the reference sample; and generating the synchronized output data set based on interpolation. In an embodiment, the contents comprise instructions executed by the computing device.

In an embodiment of the present disclosure, a device comprises a memory, which, in operation, stores data samples associated with a plurality of data sensors, and circuitry. The circuitry is coupled to the memory and, in operation, generates synchronized output data sets associated with the plurality of data sensors. Generating a synchronized output data set includes: determining a reference sample associated with a sensor of the plurality of sensors; verifying a timing validity of a data sample associated with another sensor of the plurality of sensors; identifying a closest-in-time data sample associated with the another sensor of the plurality of sensors with respect to the reference sample; and generating the synchronized output data set based on the reference sample and the closest-in-time sample associated with the another sensor of the plurality of sensors, the generating including selectively applying interpolation. In an embodiment, the system includes the plurality of sensors.

The various embodiments described above can be combined to provide further embodiments. Aspects of the embodiments can be modified, if necessary to employ concepts of the various embodiments and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
   a memory, which, in operation, stores data samples associated with a plurality of data sensors, wherein the memory is organized into a plurality of first-in-first-out (FIFO) buffers storing data samples associated with respective sensors of the plurality of sensors; and
   circuitry, coupled to the memory, wherein the circuitry, in operation, generates synchronized output data sets associated with the plurality of data sensors, generating a synchronized output data set including:
      determining a reference sample associated with a sensor of the plurality of sensors;
      verifying a timing validity of a data sample associated with another sensor of the plurality of sensors;
      identifying a closest-in-time data sample associated with the another sensor of the plurality of sensors with respect to the reference sample; and
      generating the synchronized output data set based on interpolation.

2. The device of claim 1 wherein the determining the reference sample includes verifying that the memory stores at least one data sample associated with each sensor of the plurality of sensors and identifying a most-recently received sample of received samples associated with sensors of the plurality of sensors as the reference sample.

3. The device of claim 1 wherein the verifying the timing validity of a data sample comprises determining a difference between a time stamp of the data sample and a time stamp of the reference sample and comparing the difference to a threshold value.

4. The device of claim 3 wherein the threshold value is a longest output data rate (ODR) period of the sensors of the plurality of sensors.

5. The device of claim 1 wherein identifying a closest-in-time data sample associated with the another data sensor with respect to the reference sample comprises, starting with a most-recently received data sample associated with the another data sensor, determining a difference between a time stamp of the data sample and a time stamp of the reference sample, comparing the difference to a threshold value and identifying the data sample as the closest-in-time data sample based on the comparison.

6. The device of claim 5 wherein the threshold value is a longest output data rate (ODR) period of the sensors of the plurality of sensors.

7. The device of claim 1 wherein the generating the synchronized output data set based on interpolation comprises:
   comparing a time stamp of the reference sample to a time stamp of the closest-in-time sample.

8. The device of claim 7 wherein the generating the synchronized output data set based on interpolation comprises:
   in response to the comparison indicating the time stamp of the reference sample is greater than the time stamp of the closest-in-time sample, determining whether the reference sample is the only sample associated with the sensor;
   in response to determining the reference sample is the only sample associated with the sensor, including the reference sample and the closest-in-time sample in the synchronized output data set; and
   in response to determining the reference sample is not the only sample associated with the sensor, interpolating the reference sample and including the interpolated reference sample and the closest-in-time sample in the synchronized output data set.

9. The device of claim 8 wherein the generating the synchronized output data set based on interpolation comprises:
   in response to the comparison indicating the time stamp of the reference sample is not greater than the time stamp of the closest-in-time sample, determining whether the closest-in-time sample is the only sample associated with the another sensor;
   in response to determining the closest-in-time sample is the only sample associated with the another sensor, including the reference sample and the closest-in-time sample in the synchronized output data set; and
   in response to determining the closest-in-time sample is not the only sample associated with the another sensor, interpolating the closest-in-time sample and including the reference sample and the interpolated closest-in-time sample in the synchronized output data set.

10. The device of claim 1, wherein the synchronized output data set includes data associated with two or more data sensors of the plurality of data sensors.

11. A system, comprising:
    a plurality of data sensors;
    a memory, which, in operation, stores data samples associated with the plurality of data sensors, wherein the memory is organized into a plurality of first-in-first-out (FIFO) buffers storing data samples associated with respective sensors of the plurality of sensors; and circuitry, coupled to the memory, wherein the circuitry, in operation, generates synchronized output data sets associated with the plurality of data sensors, generating a synchronized output data set including:
  determining a reference sample associated with a sensor of the plurality of sensors;
  verifying a timing validity of a data sample associated with another sensor of the plurality of sensors;
  identifying a closest-in-time data sample associated with the another sensor of the plurality of sensors with respect to the reference sample; and
  generating the synchronized output data set based on interpolation.

12. The system of claim 11 wherein the determining the reference sample includes verifying that the memory stores at least one data sample associated with each sensor of the plurality of sensors and identifying a most-recently received sample of received samples associated with sensors of the plurality of sensors as the reference sample.

13. The system of claim 11 wherein identifying a closest-in-time data sample associated with the another data sensor with respect to the reference sample comprises, starting with a most-recently received data sample associated with the another data sensor, determining a difference between a time stamp of the data sample and a time stamp of the reference sample, comparing the difference to a threshold value and identifying the data sample as the closest-in-time data sample based on the comparison.

14. The system of claim 11 wherein the generating the synchronized output data set based on interpolation comprises:
  comparing a time stamp of the reference sample to a time stamp of the closest-in-time sample.

15. The system of claim 14 wherein the generating the synchronized output data set based on interpolation comprises:
  in response to the comparison indicating the time stamp of the reference sample is greater than the time stamp of the closest-in-time sample, determining whether the reference sample is the only sample associated with the sensor;
  in response to determining the reference sample is the only sample associated with the sensor, including the reference sample and the closest-in-time sample in the synchronized output data set;
  in response to determining the reference sample is not the only sample associated with the sensor, interpolating the reference sample and including the interpolated reference sample and the closest-in-time sample in the synchronized output data set;
  in response to the comparison indicating the time stamp of the reference sample is not greater than the time stamp of the closest-in-time sample, determining whether the closest-in-time sample is the only sample associated with the another sensor;
  in response to determining the closest-in-time sample is the only sample associated with the another sensor, including the reference sample and the closest-in-time sample in the synchronized output data set; and
  in response to determining the closest-in-time sample is not the only sample associated with the another sensor, interpolating the closest-in-time sample and including the reference sample and the interpolated closest-in-time sample in the synchronized output data set.

16. The system of claim 11, wherein the synchronized output data set includes data associated with two or more data sensors of the plurality of data sensors.

17. A method, comprising:
generating synchronized output data sets associated with a plurality of data sensors, the generating a synchronized output data set including:
  storing data samples associated with the plurality of sensors into respective first-in-first-out (FIFO) buffers;
  determining a reference sample associated with a sensor of the plurality of sensors;
  verifying a timing validity of a data sample associated with another sensor of the plurality of sensors;
  identifying a closest-in-time data sample associated with the another sensor of the plurality of sensors with respect to the reference sample; and
  generating the synchronized output data set based on interpolation.

18. The method of claim 17, wherein the determining the reference sample includes verifying that the FIFO buffers store at least one data sample associated with each sensor of the plurality of sensors and identifying a most-recently received sample of received samples associated with sensors of the plurality of sensors as the reference sample.

19. The method of claim 17, wherein identifying a closest-in-time data sample associated with the another data sensor with respect to the reference sample comprises, starting with a most-recently received data sample associated with the another data sensor, determining a difference between a time stamp of the data sample and a time stamp of the reference sample, comparing the difference to a threshold value and identifying the data sample as the closest-in-time data sample based on the comparison.

20. The method of claim 17, wherein the generating the synchronized output data set based on interpolation comprises:
  comparing a time stamp of the reference sample to a time stamp of the closest-in-time sample;
  in response to the comparison indicating the time stamp of the reference sample is greater than the time stamp of the closest-in-time sample, determining whether the reference sample is the only sample associated with the sensor;
  in response to determining the reference sample is the only sample associated with the sensor, including the reference sample and the closest-in-time sample in the synchronized output data set;
  in response to determining the reference sample is not the only sample associated with the sensor, interpolating the reference sample and including the interpolated reference sample and the closest-in-time sample in the synchronized output data set;
  in response to the comparison indicating the time stamp of the reference sample is not greater than the time stamp of the closest-in-time sample, determining whether the closest-in-time sample is the only sample associated with the another sensor;
  in response to determining the closest-in-time sample is the only sample associated with the another sensor, including the reference sample and the closest-in-time sample in the synchronized output data set; and
  in response to determining the closest-in-time sample is not the only sample associated with the another sensor, interpolating the closest-in-time sample and including the reference sample and the interpolated closest-in-time sample in the synchronized output data set.

21. A non-transitory computer-readable medium having contents which cause a computing device to generate synchronized output data sets associated with a plurality of data sensors, the generating a synchronized output data set including:

storing data samples associated with the plurality of sensors into respective first-in-first-out (FIFO) buffers;

determining a reference sample associated with a sensor of the plurality of sensors;

verifying a timing validity of a data sample associated with another sensor of the plurality of sensors;

identifying a closest-in-time data sample associated with the another sensor of the plurality of sensors with respect to the reference sample; and generating the synchronized output data set based on interpolation.

22. The non-transitory computer-readable medium of claim 21, wherein the contents comprise instructions executed by the computing device.

23. A system, comprising:

a memory, which, in operation, stores data samples associated with a plurality of data sensors, wherein the memory is organized into a plurality of first-in-first-out (FIFO) buffers storing data samples associated with respective sensors of the plurality of sensors; and circuitry, coupled to the memory, wherein the circuitry, in operation, generates synchronized output data sets associated with the plurality of data sensors, generating a synchronized output data set including:

determining a reference sample associated with a sensor of the plurality of sensors;

verifying a timing validity of a data sample associated with another sensor of the plurality of sensors;

identifying a closest-in-time data sample associated with the another sensor of the plurality of sensors with respect to the reference sample; and generating the synchronized output data set based on the reference sample and the closest-in-time sample associated with the another sensor of the plurality of sensors, the generating including selectively applying interpolation.

24. The system of claim 23, comprising the plurality of sensors.